United States Patent [19]

Thoma et al.

[11] Patent Number: 4,947,369
[45] Date of Patent: Aug. 7, 1990

[54] MICROWORD GENERATION MECHANISM UTILIZING A SEPARATE BRANCH DECISION PROGRAMMABLE LOGIC ARRAY

[75] Inventors: Nandor G. Thoma, Boca Raton; Victor S. Moore, Pompano Beach; Wayne R. Kraft, Coral Springs, all of Fla.

[73] Assignee: International Business Machines Corporation, Armonk, N.Y.

[21] Appl. No.: 416,881

[22] Filed: Oct. 4, 1989

Related U.S. Application Data

[63] Continuation of Ser. No. 452,554, Dec. 12, 1982, abandoned.

[51] Int. Cl.⁵ .............................................. G06F 9/42
[52] U.S. Cl. ..................................... 364/900; 364/462; 364/466; 364/491
[58] Field of Search ... 364/200 MS File, 900 MS File

[56] References Cited

U.S. PATENT DOCUMENTS

| | | | |
|---|---|---|---|
| 3,401,376 | 9/1968 | Barnes et al. | 364/200 |
| 3,800,293 | 3/1974 | Engar | 364/200 |
| 3,949,370 | 4/1976 | Reyling et al. | 364/200 |
| 3,967,104 | 6/1976 | Brantingham | 364/900 |
| 3,991,404 | 11/1976 | Brioschi et al. | 364/200 |
| 4,161,778 | 7/1979 | Getson et al. | 364/200 |
| 4,179,737 | 12/1979 | Kim | 364/200 |
| 4,254,461 | 3/1981 | Chemla et al. | 364/200 |
| 4,354,228 | 10/1982 | Moore et al. | 364/200 |
| 4,378,590 | 3/1983 | Kim | 364/200 |

OTHER PUBLICATIONS

Microelectronics and Reliability, vol. 15, pp. 329-333, Lau.
Electronics Letters, vol. 17 (1981), Sep., No. 19, London, England, p. 709.

*Primary Examiner*—David Y. Eng

[57] ABSTRACT

A microword generation mechanism is provided for producing the sequences of microwords used to control the execution of processor instructions in a microprogrammed digital data processor. This microword generation mechanism includes programmable logic array means responsive to the processor instructions for producing the appropriate microword sequences. The microword generation mechanism also includes condition indicator circuitry for supplying indicator signals indicating whether the results of arithmetic and logic operations in the processor meet certain types of conditions. The microword generation mechanism further includes a condition testing programmable logic array responsive to the condition field of a conditional branch type processor instruction for testing the appropriate indicator signal or signals and causing a branch type microword sequence to be produced if the specified condition is met.

6 Claims, 9 Drawing Sheets

FIG. 2

| CONDITION TESTED | | | INDICATORS TESTED | | | | |
|---|---|---|---|---|---|---|---|
| TYPE | CODE | DESCRIPTION | E | C | O | N | Z |
| P | 000 | ZERO OR EQUAL | | | | | 1 |
| N | 000 | NOT ZERO OR UNEQUAL | | | | | 0 |
| P | 001 | POSITIVE AND NOT ZERO | | | | 0 | 0 |
| N | 001 | NOT POSITIVE | | | | 1 | 1 |
| P | 010 | NEGATIVE | | | | 1 | |
| N | 010 | NOT NEGATIVE | | | | 0 | |
| P | 011 | EVEN | 1 | | | | |
| N | 011 | NOT EVEN | 0 | | | | |
| P | 100 | ARITHMETICALLY LESS THAN | | | 0 1 | 1 0 | |
| P | 101 | ARITHMETICALLY LESS THAN OR EQUAL | | | 0 1 | 1 0 | 1 |
| N | 100 | ARITHMETICALLY GREATER THAN OR EQUAL | | | 1 0 | 1 0 | |
| N | 101 | ARITHMETICALLY GREATER THAN | | | 1 0 | 1 0 | 0 0 |
| P | 110 | LOGICALLY LESS THAN OR EQUAL | | 1 | | | 1 |
| P | 111 | LOGICALLY LESS THAN (CARRY) | | 1 | | | |
| N | 110 | LOGICALLY GREATER THAN | | 0 | | | 0 |
| N | 111 | LOGICALLY GREATER THAN OR EQUAL (NO CARRY) | | 0 | | | |

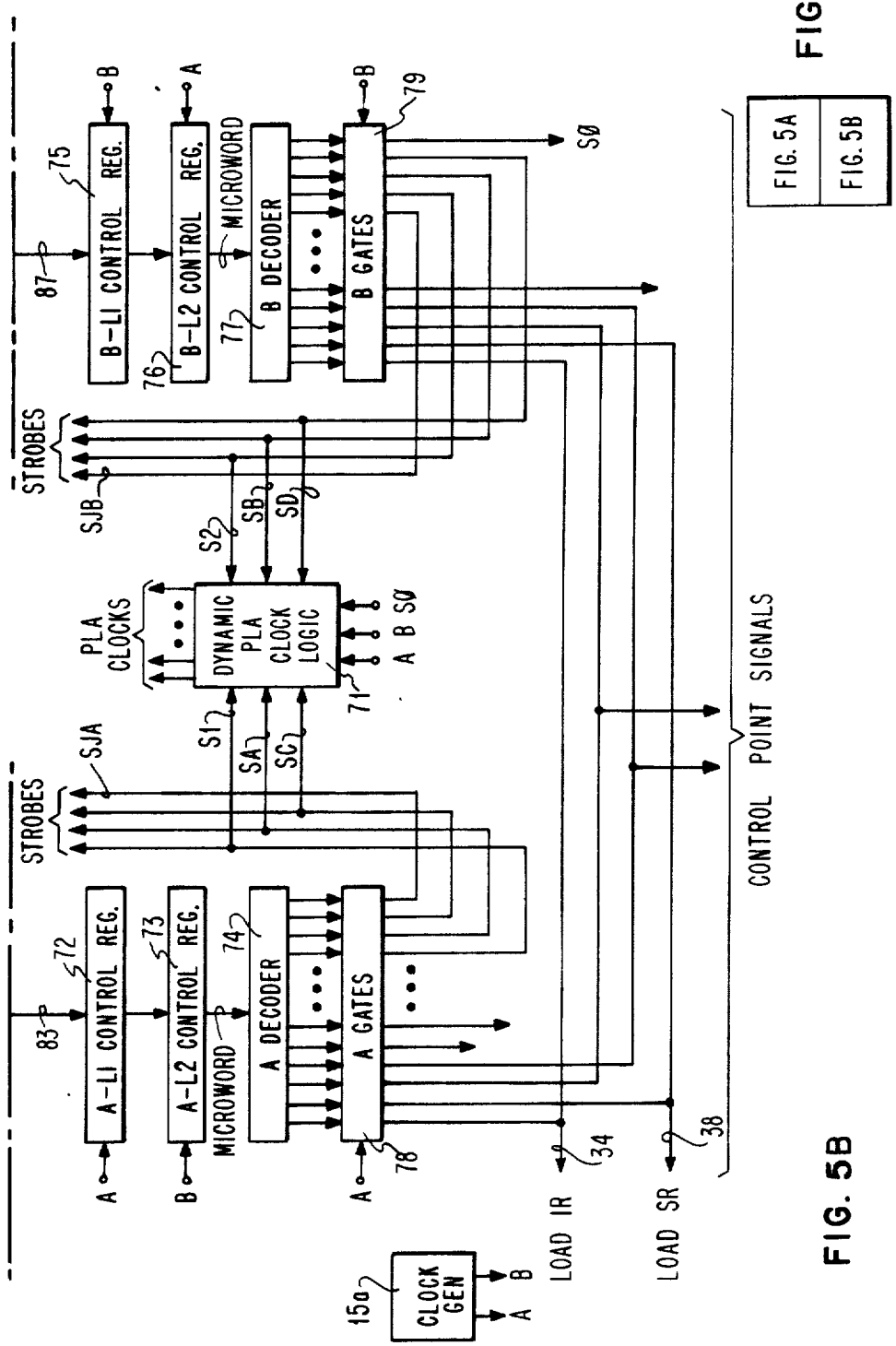

JUMP INSTRUCTION

BRANCH INSTRUCTION

MICROWORD GENERATION MECHANISM UTILIZING A SEPARATE BRANCH DECISION PROGRAMMABLE LOGIC ARRAY

This is a continuation of co-pending application Ser. No. 452,554, filed on Dec. 12, 1982, now abandoned.

CROSS-REFERENCE TO RELATED APPLICATIONS

The present patent application is related to the following copending U.S. patent applications:

(1) Application Ser. No. 350,660, filed Feb. 22, 1982, entitled "Microword Control System Utilizing Multiplexed Programmable Logic Arrays", the inventors being Victor S. Moore et al now U.S. Pat. No. 4,594,661 granted June 10, 1986;

(2) Application Ser. No. 350,662, filed Feb. 22, 1982, entitled "Microword Control System Utilizing A Programmable Logic Array And A Sequence Counter", the inventors being Joel C. Leininger et al, now U.S. Pat. No. 4,509,114, granted Apr. 2, 1985;

(3) Application Ser. No. 350,663, filed Feb. 22, 1982, entitled "Microword Generation Mechanism Utilizing Separate Programmable Logic Arrays For First And Second Microwords", the inventors being Joseph C. Rhodes, Jr. et al now U.S. Pat. No. 4,685,080 granted Aug. 4, 1987;

(4) Application Ser. No. 334,185, filed Dec. 24, 1981, entitled "Large Scale Integration Data Processor Signal Transfer Mechanism", the inventors being Virgil D. Wyatt et al, now U.S. Pat. No. 4,567,561, granted Jan. 28, 1986;

(5) Application Ser. No. 350,683, filed Feb. 22, 1982, entitled "Clocking Mechanism For Multiple Overlapped Dynamic Programmable Logic Arrays Used In A Digital Control Unit", the inventors being Gerard A. Veneski et al, now U.S. Pat. No. 4,575,794, granted Mar. 11, 1986;

(6) Application Ser. No. 350,682, filed Feb. 22, 1982, entitled "Microcode Control Mechanism Utilizing Programmable Microcode Repeat Counter", the inventors being Tony E. Parker et al, now U.S. Pat. No. 4,556,938, granted Dec. 3, 1985;

(7) Application Ser. No. 350,681, filed Feb. 22, 1982, entitled "Integrated Circuit Mechanism For Coupling Multiple Programmable Logic Arrays To A Common Bus", the inventors being Wayne R. Kraft et al now U.S. Pat. No. 4,583,193 granted Apr. 15, 1986;

(8) Application Ser. No. 388,556, filed June 15, 1982, entitled "Binary Logic Structure Employing Programmable Logic Arrays And Useful In Microword Generation Apparatus", the inventors being Victor S. Moore et al, now U.S. Pat. No. 4,556,938, granted Dec. 3, 1985;

(9) Application Ser. No. 452,526, filed Dec. 23, 1982, entitled "Microprocessor Control System Utilizing Overlapped Programmable Logic Arrays", the inventor being Gerard A. Veneski now U.S. Pat. No. 4,661,901 granted Apr. 28, 1987.

The descriptions set forth in these copending applications are hereby incorporated in the present application by this reference thereto.

TECHNICAL FIELD

This invention relates to microword generation mechanisms for use in microprogrammed digital systems, such as microprogrammed digital data processors and digital computers, wherein a sequence of microwords are used to control the execution of each system instruction. This invention is particularly useful in data processors and digital computers wherein the principal circuit sections are formed on large scale integration (LSI) integrated circuit chips.

BACKGROUND ART

In a microprogrammed digital computer or data processor, microwords are read from an internal control storage unit to provide the internal processor control actions which are needed to execute the system or processor instructions obtained from the user's software program. The microwords are read from the storage unit and set into a control register one at a time. Each microword consists of multiple binary bits, some or all of which may be organized into plural-bit control groups or control fields. The control register drives a decoder mechanism which produces the elemental control point signals which, in turn, control the various data flow gates and data manipulation mechanisms located in the data processor. Each microword controls the internal operation of the data processor for one microword cycle. Several microwords are normally needed to execute a processor instruction. Some processor instructions require only a few microwords, while others require many microwords to complete their execution.

The current trend is to fabricate the principal sections, including the microword control unit section of a data processor on large scale integration (LSI) integrated circuit chips. The overall objective is to increase the number of data processing functions that can be provided on a single integrated circuit chip, with the ultimate goal of providing a complete data processor or digital computer on a single chip. Currently, the best technology for packing the largest number of circuits onto a single chip is the so-called metal oxide semiconductor field effect transistor (MOSFET) technology. Such technology makes possible a very high circuit density on an integrated circuit chip. Unfortunately, MOSFET circuits have a somewhat slower operating speed than do circuits fabricated by means of other integrated circuit technologies, such as, for example, the so-called bipolar integrated circuit technology. Thus, it would be desirable to find ways to increase the operating speed of data processor mechanisms which employ MOSFET circuits. Also, even though the MOSFET technology provides a high circuit density, care should be taken not to be wasteful of circuit space. In other words, it remains desirable to provide circuit mechanisms which reduce the amount of circuitry required on the integrated circuit chip.

SUMMARY OF INVENTION

This invention provides an improved microword generation mechanism which can be readily fabricated in MOSFET circuit technology and which will provide significantly faster operating speeds than are provided by currently available MOSFET microword generation mechanisms of equivalent size (total microword bit capacity). In general, this is accomplished by providing a microword generation mechanism wherein the customary random access control storage unit and its addressing circuitry are replaced by a plurality of programmable logic arrays (PLA's). In particular, this is accomplished by providing a novel configuration of programmable logic arrays which can handle the execution of conditional jump and conditional branch type procesor instructions in a more efficient and rapid manner. Since most user programs contain a goodly number of branch and jump instructions, this will normally enable a considerable saving in overall processing time.

In performing conditional jump and branch instructions, it is first necessary to test one or more condition indicator signals to determine whether a specified condition is met. If it is, the jump or branch to a particular out of sequence processor instruction is taken. Otherwise, the jump or branch is not taken and the next sequential processor instruction in the user program is executed.

In accordance with the present invention, this condition testing is performed by means of a separate programmable logic array (PLA) which is separate and distinct from the other PLA's which produce the majority of the microwords. This separate condition testing PLA produces a simple yes or no decision signal which is used to determine whether a branch or no branch microword sequence is produced. This provides several advantages. For one thing, it reduces the number of product lines required in the primary PLA mechanism. This helps reduce the size of the primary PLA mechanism which in turn improves its operating speed. At the same time, the size of the condition testing PLA is relatively small and its operating speed is very fast. Also, a further saving in time is realized because the accessing of the separate condition testing PLA can be overlapped with the normal operation of the primary PLA mechanism.

In accordance with another aspect of the present invention, a further improvement in performance can be obtained by providing a second separate programmable logic array for producing the microwords needed for executing the branch and jump instructions. This separate branch code PLA provides the microword sequences for the branch type processor instructions, while the primary PLA mechanism provides the microword sequences for the non-branch type processor instructions. In this case, the decision signal from the condition testing PLA is supplied to the branch code PLA to control the selection of the microword sequence produced by the branch code PLA. This combination of condition testing PLA plus branch code PLA vides a very fast path which operates in parallel with the remainder of the PLA structure which is providing the microword sequences for the non-branch type system instructions. This makes the branch microwords available in a very rapid manner.

By way of definition, the term "branch type" is used herein and in the appended claims as a generic term which includes branch instructions, jump instructions and any other kind of program instruction which will cause the data processor to go to an instruction other than the next sequential program instruction.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 2 is a chart used in explaining the various condition indicators which are tested by conditional branch and jump instructions in the FIG. 1 data processor;

FIGS. 5A and 5B, taken together in the manner shown in FIG. 5, provide a functional block diagram of a data processor control unit which includes a microword generation mechanism constructed in accordance with a third embodiment of the present invention;

FIG. 6 is a timing diagram used in explaining the operation of the control unit of FIG. 5;

DESCRIPTION OF THE FIG. 1 DATA PROCESSOR

Figure 1:
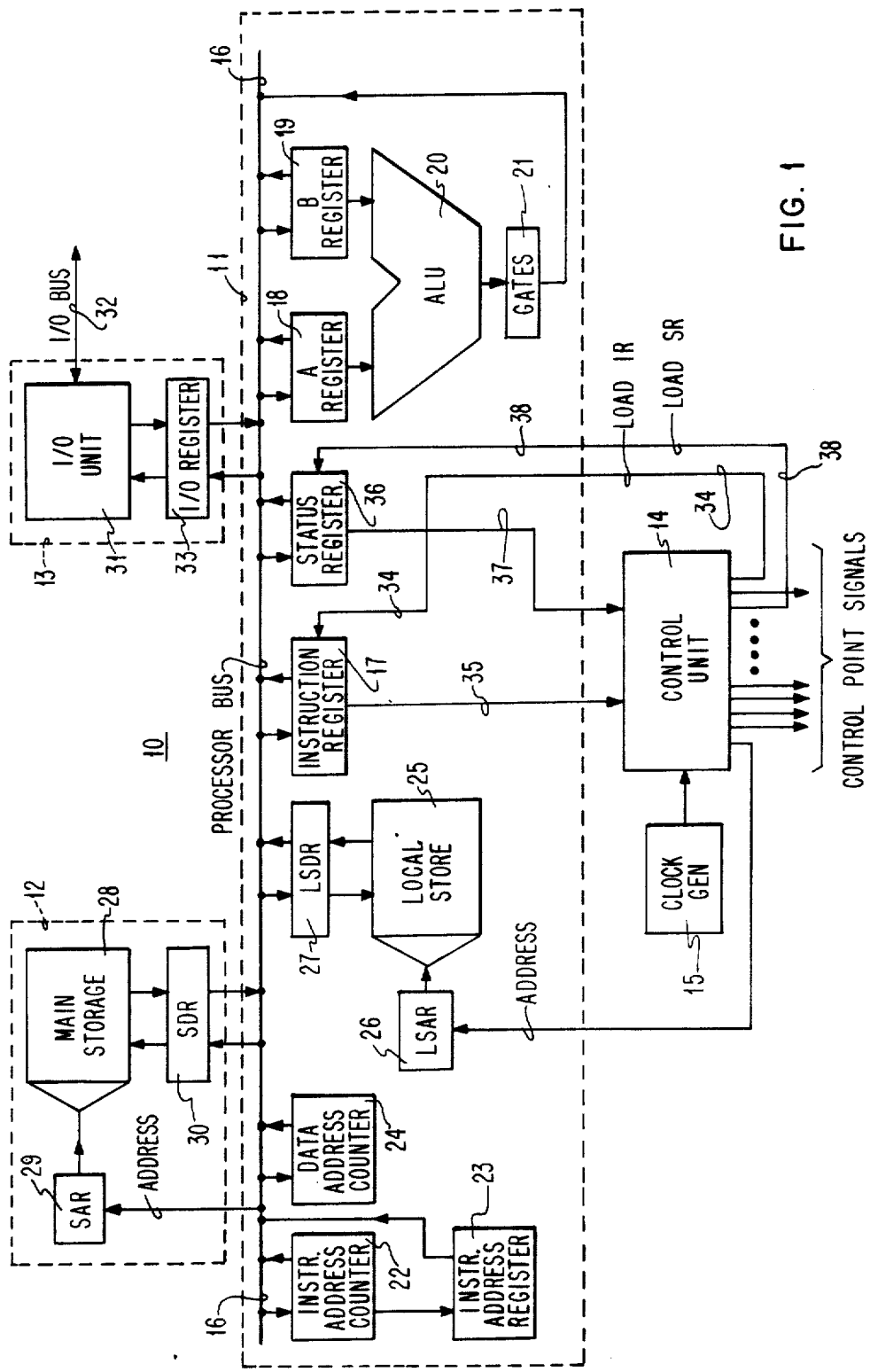
FIG. 1 is a functional block diagram of a digital data processor wherein the present invention may be used to advantage.

Referring to FIG. 1, there is shown a functional block diagram of a microprogrammed digital system wherein a sequence of microwords are used to control the execution of each system instruction. This digital system of FIG. 1 is a microprogrammed digital computer or digital data processor 10. This data processor 10 is particularly suitable for fabrication on large scale integration (LSI) type integrated circuit chips. This data processor 10 includes a data flow unit 11, a main storage unit 12, an input/ output (I/O) unit 13, a control unit 14 and a clock generator 15. The data flow unit 11 is sometimes called a central processing unit (CPU) and includes such things as an arithmetic and logic unit (ALU), various hardware registers and counters, a local storage unit and a bus system interconnecting these items with one another. The data flow unit 11 is the unit that does the adding, subtracting, rearranging and other manipulation of the user data to produce the results desired by the user of the machine. The control unit 14 controls the operation of the data flow unit 11, the main storage unit 12 and the I/O unit 13 by way of control point signals which are supplied to the various functional mechanisms located in these units. For simplicity of illustration, the connections of most of the control point signal lines to their respective registers, counters and so forth are not shown in the drawing.

A multiconductor processor bus 16 is used to interconnect the various registers, counters and other functional units located in the data flow unit 11. For sake of example, this processor bus 16 is assumed to be a 16-bit or 16-conductor bus. Consistent therewith, the various registers and counters coupled to the processor bus 16 are assumed to be 16-stage or 16-bit registers and counters.

The data flow unit 11 includes an instruction register 17, an A register 18 and a B register 19, each of which has both its input circuitry and its output circuitry coupled to the processor bus 16 for supplying plural bit binary signals thereto and receiving plural bit binary signals therefrom. The A and B registers 18 and 19 drive an arithmetic and logic unit (ALU) 20, the output of which is coupled to the processor bus 16 by way of a set of 16 parallel gating circuits 21. The data flow unit 11 also includes an instruction address counter 22, an instruction address register 23 and a data address counter 24 which are coupled to the processor bus 16 for providing storage addresses for the main storage unit 12. The instruction address register 23 is useful for the case of plural word instructions. In such case, the address of the first word of the instruction is loaded into the register 23 to save same while the address counter 22 is updated to address the second word or the second and third words of the instruction, as the case may be. The first word includes the operation code field which identifies the particular instruction to be executed.

The data flow unit 11 further includes a local storage unit 25 having associated therewith a local storage address register (LSAR) 26 and a local storage data register (LSDR) 27. LSDR 27 is coupled to the processor bus 16 for use in transferring binary data from the processor bus 16 to the local storage unit 25 and vice versa. Local storage unit 25 includes various general purpose registers for temporarily storing data and the like during the performance of the user program being performed by the data processor 10. For simplicity of explanation, LSAR 26 is assumed to receive local storage addresses from the control unit 14.

The main storage unit 12 includes a main storage mechanism 28, a storage address register (SAR) 29 and a storage data register (SDR) 30. SAR 29 is coupled to the processor bus 16 for receiving storage addresses from the instruction and data address counters 22 and 24. SDR 30 is also coupled to the processor bus 16 for transferring data, instructions and the like from the main storage mechanism 28 to the processor bus 16, or vice versa.

The I/O unit 13 includes an I/O drive unit 31 which is coupled to an I/O bus 32 which runs to various peripheral units associated with the data processor 10. I/O unit 31 is coupled to the processor bus 16 by way of an I/O register 33. I/O register 33 is used to transfer data from the I/O device unit 31 to the processor bus 16 and vice versa.

The control unit 14 includes a microword generation mechanism for producing a sequence of microwords for each system instruction, in this case, processor instruction resident in the instruction register 17. These microwords, in turn, produce the control point signals which control the operations of the various other elements shown in FIG. 1. For example, individual control point signal lines run from the output of the control unit 14 to the load control terminals of the registers and counters 17, 18, 19, 22, 23, 24, 27, 29, 30 and 33. In a similar manner, various other control point signal lines run from the output of the control unit 14 to the output gating terminals of the various registers and counters 17, 18, 19, 21, 22, 23, 24, 27, 30 and 33. Thus, by activating the appropriate pair of control point signal lines, one of the registers can be caused to output its data onto the processor bus 16 and another one of the registers can be caused to load itself with the data appearing on the processor bus 16. Additional control point signal lines run to the ALU 20, gates 21 and LSAR 26 for purposes of controlling same. For simplicity of illustration, these various control point signal lines are, for the most part, not shown in FIG. 1. An exception is the case of a control point signal line 34 which runs to the load control terminal of the instruction register 17 for purposes of loading into the instruction register 17 the processor instruction fetched from the main storage unit 28.

The user program to be performed by the data processor 10 is initially loaded into the main storage unit 28 from one of the peripheral units coupled to the I/O bus 32. This is accomplished by way of the I/O unit 31, the I/O register 33, the processor bus 16 and the storage data register 30. Thereafter, the user program is performed by reading from the main storage unit 28 in a sequential manner the various system or processor instructions which make up the user program. Each processor instruction, in its turn, is transferred by way of SDR 30 to the processor bus 16. It is then loaded into the instruction register 17 to identify to the control unit 14 by way of multiconductor bus 35 the particular processor instruction to be executed.

The processor instruction loaded into the instruction register 17 may be, for example, a request to add a first operand residing in the local store 25 to a second operand located at a particular address in the main storage unit 28 and to store the results of such addition back into the local store 25. In response to such an instruction, the control unit 14 would activate the appropriate control point signals to cause the data flow unit 11 to fetch the second operand from the main storage unit 28 and to load it into the A register 18. Control unit 14 would then cause the first operand to be transferred from the local store 25 to the B register 19. The ALU 20 would be instructed to add the contents of the A and B registers 18 and 19. When the results of the addition appear at the output of ALU 20, the control unit 14 would thereafter cause such results to be supplied back to and stored into the local store 25. As a concluding part of the current instruction, the control unit 14 would cause the next processor instruction to be fetched from the main storage unit 28 and loaded into the instruction register 17.

For the case of plural-word instructions, it is the first word which is loaded into the instruction register 17. Depending on the particular instruction being considered, the second word and, if used, the third word of the instruction may be loaded into one or more of the A register 18, the B register 19, the data address counter 24 or an appropriate general purpose register in the local store 25.

The present invention is particularly concerned with the efficient and rapid handling of conditional branch and conditional jump type processor instructions. These instructions cause the processor 10 to jump or branch to an out-of-sequence instruction if the particular condition specified by the branch or jump instruction is met. If the specified condition is not met, the processor 10 will simply proceed with the fetching and execution of the next sequential instruction in the user program. These jump and branch conditions usually relate to the results of the various arithmetic and logic operations performed by the ALU 20. The chart of FIG. 2 shows a typical set of such conditions, any one of which may be specified by a particular jump or branch instruction.

In order to determine whether a condition is met, it is necessary to provide various indicator signals which provide indications of the nature of the result of an arithmetic or logic operation performed by the ALU 20. As indicated in FIG. 2, these indicator signals are the E, C, 0, N and Z signals. The E signal is an "Even" indicator which has a value of one if the result of the ALU operation is an even number (lowest order bit of the result is zero). The C indicator is a "Carry" indicator and has a value of one if the result cannot be represented as an unsigned number in the operand size specified. The 0 signal is an "Overflow" signal which has a value of one if the result cannot be represented as a signed number in the operand size specified. The N signal is a "Negative" indicator signal which has a value of one if the result is a negative number (highest order bit if result is one). The Z indicator is a "Zero" indicator and has a value of one if the ALU result is all zeros.

As an example, the determination as to whether a second operand is arithmetically less than a first operand is accomplished by examining the particular ones of the ECONZ indicators indicated in FIG. 2. In this case, it is the 0 (signed number overflow) and the N (negative) indicators which are tested. Two possibilities exist. If the 0 bit is zero and the N bit is one or, alternatively, if the 0 bit is one and the N bit is zero, then the specified condition is met and the branch is taken. For this particular test, the other indicator bits, namely, the E, C and Z bits, are ignored.

FIG. 2 shows a set of instruction condition code values which can be used for the case of an instruction format having a 3-bit condition field. Half of the conditions shown in FIG. 2 are positive (P) type conditions and the other half are negative (N) type conditions. The positive types are used for "Jump on Condition" and "Branch on Condition" instructions. The negative types are used for "Jump on Not Condition" and "Branch on Not Condition" instructions. Different operation codes are used for the two types of instructions and this difference is used by the control unit 14 to determine the particular type to be executed. The "arithmetic" conditions shown in FIG. 2 are used for signed numbers, while the "logical" conditions are used for unsigned numbers.

Depending on the particular data processor architecture being considered, the terms "jump" and "branch" may or may not have exactly the same meaning. The difference, if any, usually relates to the manner in which the new out-of-sequence instruction address is calculated. For sake of example, it is assumed in the data processor of FIG. 1 that the jumped to address for a jump instruction is calculated by adding an incremental value to the current instruction address residing in the instruction address counter 22. For the case of a branch instruction, on the other hand, it is assumed that the branched to address is determined by loading a whole new address value into the instruction address counter 22. Thus, in general, a branch instruction can branch to any address in the main storage unit 28, whereas a jump instruction can jump to an address which is a relatively limited distance ahead of or behind the current instruction address.

The ECONZ indicator values are stored in the five highest order bit stages in a status register 36. After each arithmetic or logic operation is completed by the ALU 20, these status register bits are updated to reflect the proper indicator values for that operation. The indicator values stored in the status register 36 are made available to the control unit 14 by way of a multiconductor bus 37. As will be seen, the testing of these indicators to determine whether a jump or branch should be taken is performed in the control unit 14. The loading of the status register 36 is controlled by way of a control point signal line 38.

As a typical example, a branch type processor instruction will often follow a Compare type processor instruction. The Compare instruction is loaded into the instruction register 17. The resulting microword sequence produced by the control unit 14 causes a comparison of a first operand to a second operand. This is accomplished by causing the ALU 20 to subtract the first operand from the second operand. The ECONZ indicators in the status register 36 are then set to reflect the results of this subtraction operation. The branch type processor instruction is then fetched from the main storage unit 28 and set into the instruction register 17. The control unit 14 then tests the appropriate ones of the ECONZ indicator signals supplied by the status register 36 to see if they meet the conditions specified by the condition field in the branch type instruction. Assume, for example, that the condition field specifies the "Branch on Arithmetically Less Than" condition. In this case, the branch will be taken if the second operand is arithmetically less than the first operand. The term "arithmetically" means that the sign of the number is taken into account, with negative numbers being treated as less than positive numbers. If the specified condition is not met, namely, if the second operand is not arithmetically less than the first operand, then no branch is taken and the next sequential instruction is fetched from the main storage unit 28 and loaded into the instruction register 17.

Figure 3:
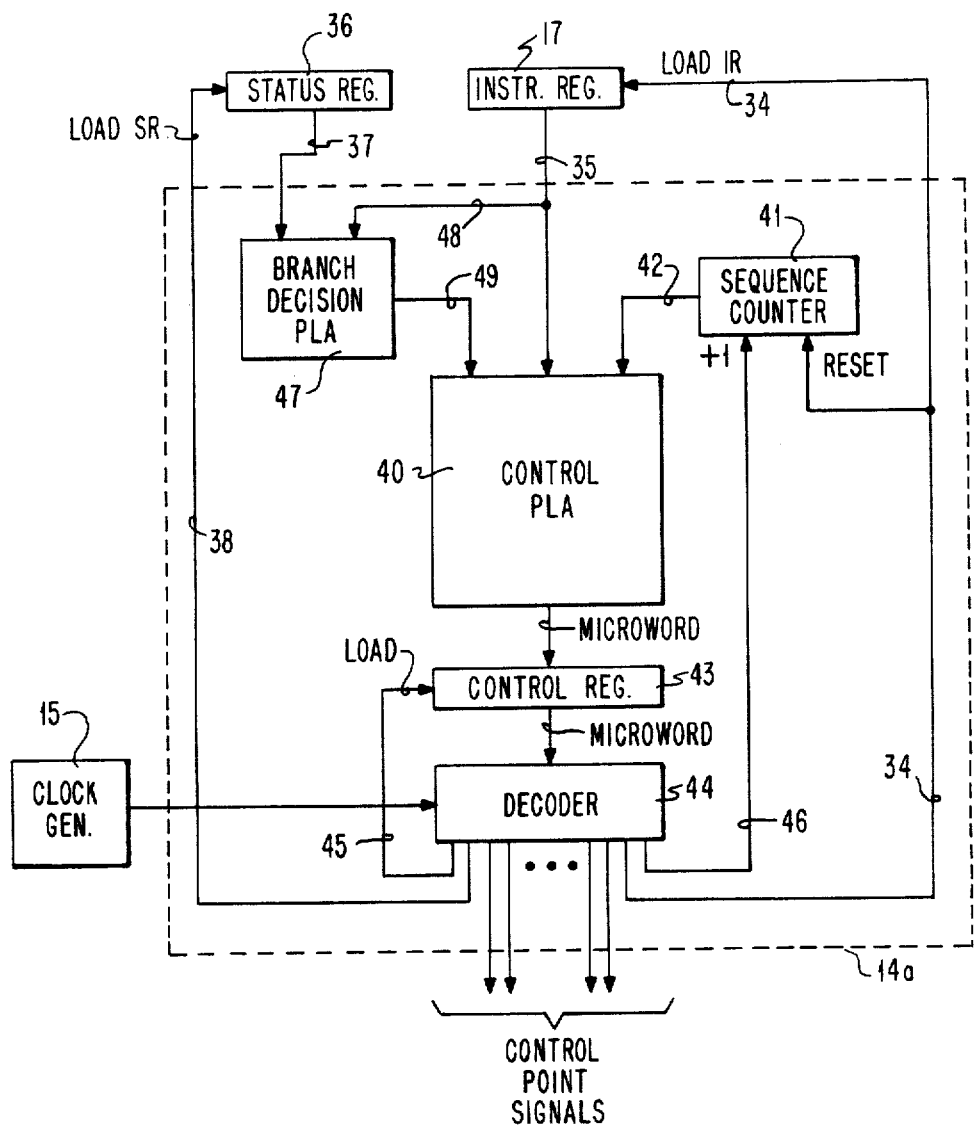
FIG. 3 is a functional block diagram of a data processor control unit which includes a microword generation mechanism constructed in accordance with a first embodiment of the present invention.

Description of the FIG. 3 Control Unit Embodiment

Referring now to FIG. 3 of the drawings, there is shown a functional block diagram of the internal construction of a control unit 14a which may be used as the control unit 14 of FIG. 1 and which includes a first embodiment of an improved microword generation mechanism constructed in accordance with the present invention. Among other things, this control unit 14a includes programmable logic array means responsive to the system instructions for producing the appropriate microword sequences. The system instructions are, in this case, the processor instructions which are resident, one at a time, in the instruction register 17. This programmable logic array means includes at least one programmable logic array represented by a control programmable logic array 40. This control PLA 40 includes an input AND array connected by a goodly number of product or word lines to an output OR array.

The programmable logic array means further includes a sequence counter 41 for supplying a sequence of number signals to the control PLA 40 for causing it to produce a sequence of microwords for the processor instruction resident in the instruction register 17. This sequence counter 41 may take the form of, for example, a plural-bit binary counter for supplying plural-bit binary number signals by way of a plural-bit bus 42 to a second set of inputs for the input AND array of the control PLA 40. The instruction bits from the instruction register 17 are supplied by way of the multibit bus 35 to a first set of inputs for the input AND array portion of the control PLA 40.

In response to a particular instruction code on bus 35 and a particular sequence count on bus 42, the control PLA 40 produces at its output a particular plural-bit microword. This microword is obtained from the OR array section of the control PLA 40. By incrementing the sequence counter 41, a sequence of microwords is caused to appear one microword at a time at the output of the control PLA 40. In an approximate sense, the control PLA 40 "stores" the microwords, while the instruction code and sequence counts provide the "addresses" for selecting the microwords. In effect, the instruction code provides the base address and the sequence counter provides a series of displacement addresses for selecting the sequence of microwords needed to execute that particular processor instruction.

The control unit 14a also includes microword responsive control circuitry for controlling the operation of the digital system, in this case, the data processor 10 shown in FIG. 1. This control circuitry includes a multiple-bit control register 43 and a decoder 44. The number of bit positions in the control register 43 is the same as the number of bit positions in a single microword. The microword appearing at the output of control PLA 40 is loaded into the control register 43 at the end of the preceding microword cycle. The microword residing in control register 43 drives the decoder 44 to cause the decoder 44 to produce the particular control point signals needed for that particular microword. Clock signals from the clock generator 15 are also supplied to the decoder 44.

In general, each microword will include several encoded plural-bit control fields. Decoder 44 decodes these encoded fields to produce the appropriate individual control point signals. Any non-encoded or bit significant bits in the microword will be supplied straight through by the decoder 44. The clock generator 15 supplies the clock pulses which determine the points in time at which the control point signals actually appear at the output of the decoder 44. In some data processors, there is one clock pulse per microword cycle, while in other processors there are a group of time spaced clock pulses for each microword cycle. Decoder 44 will typically have a relatively large number of control point output lines. In a typical data processor, there may be one hundred or more such output lines. For any given microword, only a relatively small number of these lines, on the order of 10 or less, will be activated to produce the desired control actions for that particular microword.

One of the control point signals produced by the decoder 44 is supplied by way of a line 45 to time the loading of the control register 43. Another of the control point signals is supplied by way of the line 34 to control the loading of the instruction register 17 and the resetting of the sequence counter 41. A further control point signal is supplied by way of a line 46 to the increment input terminal of the sequence counter 41 for increasing the count in the sequence counter 41 by a value of one count for each microword cycle. The timing is such that immediately after a particular microword is loaded into the control register 43, the sequence counter 41 is incremented by 1 to enable the control PLA 40 to commence producing the next microword. In this manner, the control PLA 40 is caused to produce a sequence of microwords for any given processor instruction residing in the instruction register 17. The last microword in the sequence will cause the control point signal line 34 to be activated to load the next instruction into the instruction register 17 and to reset the sequence counter 41 to an initial starting count which, for sake of explanation, will be assumed to be a count of zero.

The control unit 14a further includes condition indicator circuitry for supplying indicator signals indicating whether the results of arithmetic and logic operations in the processor meet certain types of conditions. This condition indicator circuitry is represented by the plural-conductor bus 37 which supplies the E, C, 0, N and Z indicator signals from the status register 36 to the control unit 14a.

The control unit 14a also includes a condition testing programmable logic array responsive to the condition field of a conditional branch type processor instruction for testing the appropriate one or ones of the E, C, 0, N and Z indicator signals and causing a branch type microword sequence to be produced if the condition specified by the condition field of such instruction is met. This condition testing programmable logic array is represented by a the branch decision PLA 47. This branch decision PLA 47 receives the E, C, 0, N and Z indicator signals from the status register 36 via the bus 37. It also receives some, but not necessarily all, of the instruction bits from the instruction register 17 via the primary bus 35 and a branch bus 48 which may contain a sub-set of the conductors in the primary bus 35. The instruction bits supplied to the branch decision PLA 47 need include, in addition to the condition code field which identifies the particular condition to be tested, only those bits which are necessary to determine the type of branch instruction and its polarity (whether branch on condition or branch on not condition). For some processor instruction sets, less than the total number of instruction bits is required for this purpose.

The indicator bits on bus 37 and the instruction bits on bus 48 are supplied to different sets of inputs of the input AND array portion of the branch decision PLA 47. This branch decision PLA 47 has only a single output line 49 which is activated to produce an affirmative decision signal thereon if the condition specified by the condition code field of the instruction is satisfied by the appropriate one or ones of the ECONZ indicator signals from the status register 36. For example, if the condition type is P, the condition code is "100" and the 0 and N indicator bits have values of 0 and 1, respectively, then the input AND array in the PLA 47 will activate a particular product line therein which will, in turn, activate the OR array output line 49. Assuming for the moment, for the sake of simplicity, that there is only one kind of branch type instruction and that FIG. 2 shows all the different possible conditions that might be tested, then the branch decision PLA 47 would have a total of 16 product lines, there being a different product line for each of the different conditions listed in FIG. 2, and a single OR array output line. This single OR array output line would be connected to each of the product lines so that it would be activated any time any of the conditions shown in FIG. 2 is both specified by the type and condition code bits and is satisfied by the appropriate indicator bits.

In the FIG. 3, embodiment the single decision signal output line 49 is supplied to the primary programmable logic array means represented by the control PLA 40 for causing the control PLA 40 to produce a branch type microword sequence when a branch type instruction is resident in the instruction register 17 and the branch decision PLA 47 is producing an affirmative decision signal showing that the specified condition has been met. This Yes-branch microword sequence causes the data processor to branch to an out-of-sequence processor instruction, the address of which is either included in or is pointed to by the branch type instruction. If the signal on the branch decision line 49 is not an affirmative decision signal (condition not met), then the control PLA 40 produces a no- branch microword sequence which simply fetches the next sequential program instruction from the main storage unit 28.

The advantage of using the separate condition testing or branch decision PLA is that it enables a considerable saving in the number of product lines which would otherwise be required in the control PLA 40. In other words, the condition testing could instead be done inside of the primary control PLA 40. In this case, however, the microcode for each branch type instruction would need to be repeated for each possible condition test for such instruction. By using the separate condition testing PLA 47, however, this microcode repetition is eliminated and only a single set of product lines is required in the control PLA 40 for any given branch type instruction. At the same time, the condition testing or branch decision PLA is a very small and very fast PLA. Thus, all other things being equal, there is a net saving in space on the integrated circuit chip and a net increase in the average operating speed when the condition testing is done in a separate PLA.

Figure 4:
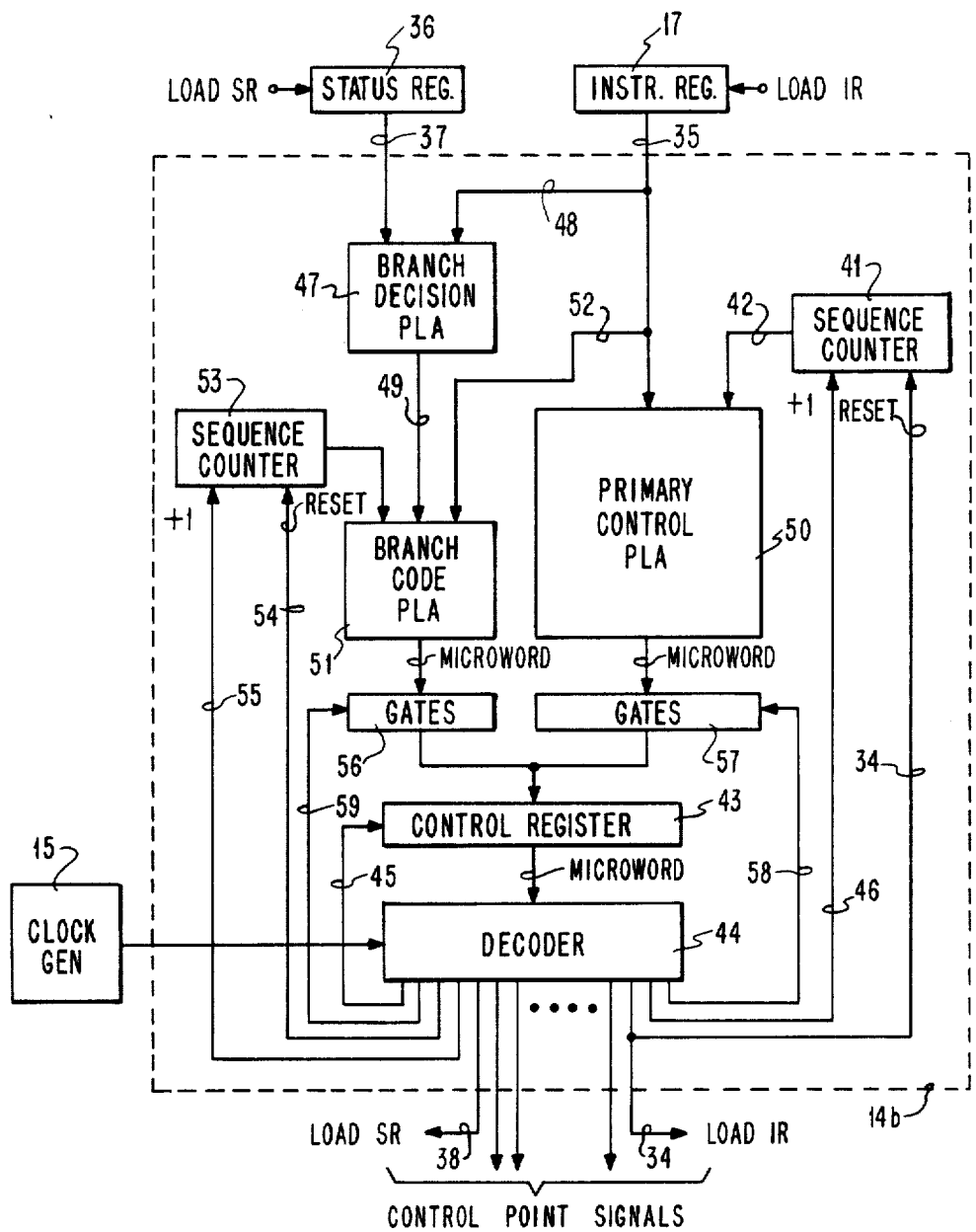
FIG. 4 is a functional block diagram of a data processor control unit which includes a microword generation mechanism constructed in accordance with a second embodiment of the present invention.

Description Of The FIG. 4 Control Unit Embodiment

Referring now to FIG. 4 of the drawings, there is shown a functional block diagram of the internal construction of a control unit 14b which may be used as the control unit 14 of FIG. 1 and which includes a second embodiment of an improved microword generation mechanism constructed in accordance with the present invention. Items which are the same as in FIG. 3 are identified by the same reference numerals as used in FIG. 3.

In FIG. 4, a primary control PLA 50 produces the microword sequences for non-branch type processor instructions, while a branch code PLA 51 produces the microword sequences for branch type processor instructions. This branch code PLA 51 is responsive to the decision signal appearing on the single output line 49 of the branch decision PLA 47 for determining whether a "Yes" branch or a "No" branch microword sequence is to be produced. The branch code PLA 51 is also responsive by way of bit lines 52 to one or more bits in the instruction register 17 for purposes of distinguishing between a jump instruction and a branch instruction. This is necessary for the case where the microword sequence required by a jump instruction is somewhat different from the microword sequence required by a branch instruction. If the same microword sequence can be used for both types of instructions, then the instruction bit lines 52 may be omitted. Where the lines 52 are required, only as many bit lines are used as are needed to tell the difference between the jump and branch instructions.

The branch code PLA 51 is also responsive to a sequence of binary number signals supplied thereto by a sequence counter 53. This sequence counter 53 is reset to a zero condition at the beginning of each branch type microword sequence by a control point signal supplied from the decoder 44 via line 54. The sequence counter 53 is incremented by a count of one during each microword cycle in the branch type sequence by way of control point signals supplied by way of line 55. Thus, for any given set of conditions on the decision line 49 and the instruction bit line 52, the sequence counter 53 is incremented a number of times to produce at the output of the branch code PLA 51 the desired sequence of microwords.

Assuming the case where a jump type instruction requires a first kind of microword sequence and a branch type of instruction requires a second kind of microword sequence, then the branch code PLA 51 would include three different kinds of microword sequences. A first of these microword sequences would be for the case of a jump instruction where the specified condition is met. A second of these microword sequences would be for the case of a branch instruction where the specified condition is met. The third microword sequence would be for the case of either a jump or a branch instruction where the condition is not met. In this latter case, the microword sequence merely causes the next sequential program instruction to be fetched from the main storage 28 and loaded into the instruction register 17.

Gates 56 and 57 provide a multiplexing action for enabling the control register 43 to receive microwords from either the primary control PLA 50 or the branch code PLA 51. During the execution of non-branch type processor instructions, gates 57 are activated by way of control point signal line 58 to enable the microwords from the primary control PLA 50 to be supplied to the control register 43. During the execution of branch type processor instructions, on the other hand, gates 56 are activated by way of control point signal line 59 to enable the microwords produced by the branch code PLA 51 to be supplied to the control register 43.

The selection between gates 56 and 57 is accomplished by providing each microword with a strobe field which causes the decoder 44 to activate the control point line 58 if the next microword is to be selected from the primary control PLA 50 and to instead activate the control point line 59 if the next microword is to be selected from the branch code PLA 51. When a branch type instruction is loaded into the instruction register 17, its presence is recognized by the primary control PLA 50 and the strobe field of the resulting microword would tell the decoder 44 to select the next microword from the branch code PLA 51. The strobe fields and the microwords produced by the branch code PLA 51 would continue to tell the decoder 44 to select branch code microwords until the last such branch code microword is reached. The strobe field in this last branch code microword would tell the decoder 44 to select the next microword from the primary control PLA 50. Assuming that the next instruction loaded into the instruction register 17 is a non-branch type instruction, the strobe field in each microword produced for such instruction would tell the decoder 44 to continue selecting the primary control PLA 50 for the next microword.

An advantage of using the separate branch code PLA 51 for the branch type microword sequences is that it provides a fast path in parallel to the larger and somewhat slower primary control PLA 50. In this regard, the branch code PLA 51 is relatively small and hence has a relatively short access time. Since branch type instructions occur fairly frequently in many different user programs, the fast parallel path provided by the branch code PLA 51 generally produces an increase in the average instruction execution speed.

Description of the FIG. 5 Control Unit Embodiment

Referring now to FIGS. 5 and 5B of the drawings (collectively referred to as FIG. 5), there is shown a functional block diagram of the internal construction of a control unit 14c which may be used as the control unit 14 of FIG. 1 and which includes a third embodiment of an improved microword generation mechanism constructed in accordance with the present invention. In this embodiment, the processor clock generator takes the form of a two-phase non-overlapping clock generator 15a. This clock generator 15a generates the A-phase and the B-phase clock signals shown in FIG. 6. Both of these clock signals are of the same frequency and have the same waveshape, the difference being that they are displaced in time relative to one another. The positive pulses of the A clock do not overlap with the positive pulses of the B clock. The amount of non-overlap shown in FIG. 6 is exaggerated for purposes of explanation. These positive pulses represent the active intervals for the two clock signals.

Figure 7:
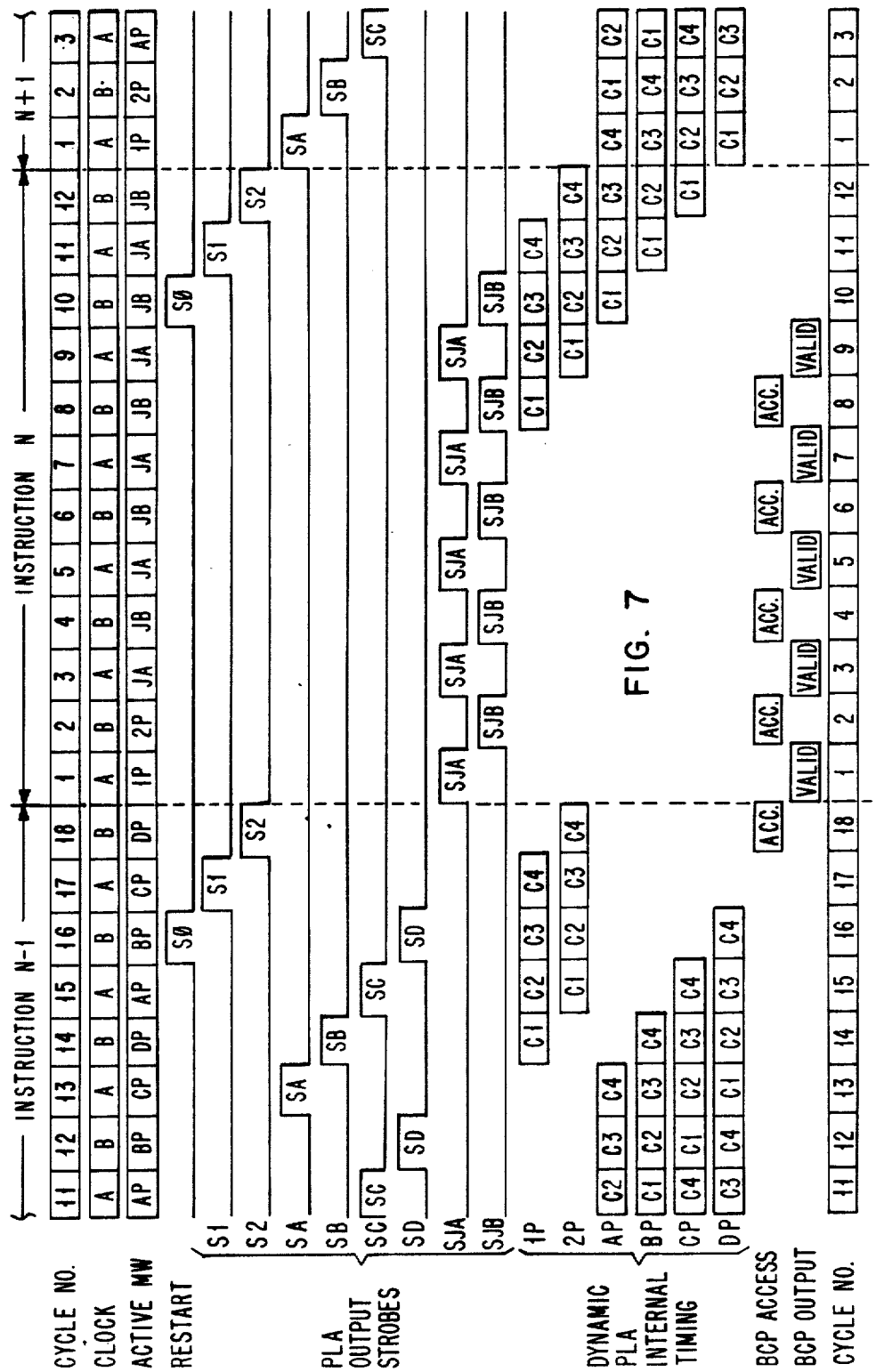

FIG. 7 is a timing diagram used in explaining a representative operation of the FIG. 5 control unit and will be referred to from time to time in connection with the description of such control unit. The occurrence times for the positive A and B clock pulses are shown on the second or "Clock" line in FIG. 7. For simplicity of illustration, the small time gaps between these pulses are not shown in FIG. 7. Each clock pulse interval shown in FIG. 7 corresponds to a different microword cycle during which a different microword is in control of the FIG. 1 data processor.

Instruction N in FIG. 7 represents by way of example a "Jump on Condition" processor instruction for the case where the condition is met. The preceding instruction N−1 which is only partially shown in FIG. 7 represents a non-branch type instruction, as does the following instruction N+1 which also is only partially shown in FIG. 7. As indicated by the cycle numbers in the top line of FIG. 7, the execution of instruction N requires 12 microword cycles and, hence, uses 12 microwords.

Returning to FIG. 5A, the improved miroword generation mechanism there shown includes an initial programmable logic array mechanism responsive to each processor instruction resident in the instruction register 17 for providing the initial microwords needed in the execution of such instruction. This initial PLA mechanism includes a first cycle PLA 60 and a second cycle PLA 61. The first cycle PLA 60 produces the first and only the first microword needed in the execution of each processor instruction. This microword is identified as the "1P" microword and, as indicated on the third or "Active MW" (Microword) line of FIG. 7, is the first microword in the microword sequences for instructions N and N+1.

The second cycle PLA 61 produces the second and only the second microword needed for each processor instruction. This microword is identified as the "2P" microword.

Figure 5A:
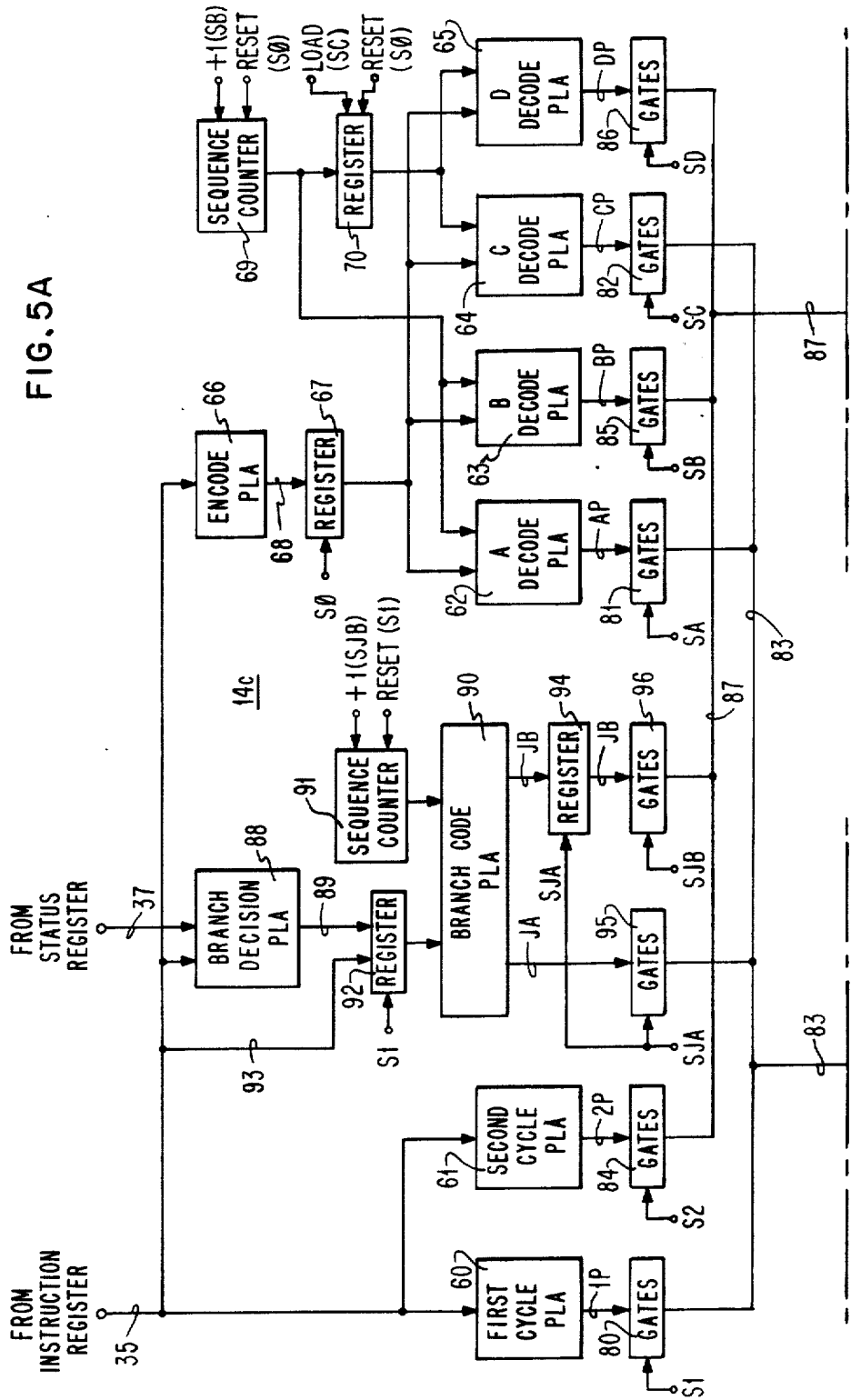
Figure 6:
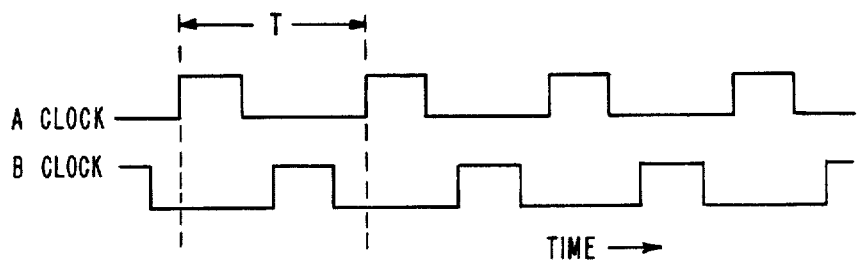
FIG. 6 is a timing diagram used in explaining the nature of the clock generator signals used in the FIG. 5 embodiment.

The control unit portion shown in FIG. 5A also includes a plurality of additional PLA mechanisms which are responsive to each non-branch type processor instruction for providing the remainder of the microwords needed to execute such non-branch type instruction. These additional PLA mechanisms include an A decode PLA 62, a B decode PLA 63, a C decode PLA 64 and a D decode PLA 65. Their output microwords are identified as AP,BP,CP and DP microwords, respectively. The microwords from these A,B,C and D decode PLA's 62–65 are used in a repeating A-B-C-D sequence to control the FIG. 1 data processor. Thus, the microword sequence for any given non-branch type processor instruction is 1-2-A-B-C-D-A-B-C-D..., where 1 and 2 denote the microwords produced by the first and second cycle PLA's 60 and 61.

The first and second cycle PLA's 60 and 61 are relatively small and fast acting PLA's which are driven directly by the processor instruction in the instruction register 17. This enables the first two microwords for each instruction to be produced very quickly. This allows more time for the other PLA's 62–65 to commence producing the remainder of the microwords for a given non-branch type processor instruction.

A first set of inputs of the decode PLA's 62–65 are driven in a parallel manner by an encode PLA 66 and a register 67. The encode PLA 66 produces a plural-bit instruction identification signal on its output bus 68, which identification signal has a smaller number of bits than does the processor instruction on bus 35. Nevertheless, this identification signal uniquely identifies the instruction to be executed.

A second set of inputs of the decode PLA's 62–65 are driven by plural-bit number signals which are produced by a sequence counter 69. The sequence count numbers for the last two decode PLA's 64 and 65 are supplied by way of a register 70. This is done to adjust the timing to take into account the overlapped operation of the different decode PLA's 62–65.

In the present embodiment, the first and second cycle PLA's 60 and 61 and the decode PLA's 62–65 are so-called dynamic or clocked PLA's. As such, each uses a set of four time spaced non-overlapping clocking pulses C1,C2,C3 and C4 to produce each valid output bit pattern. As is indicated in FIG. 7 by the Dynamic PLA Internal Timing patterns, the C1-C2-C3-C4 clock pulse sets for the successive ones of the dynamic PLA's 60–65 are offset relative to one another by one microword cycle so that the C1 pulse for the second PLA 61 coincides with the C2 pulse for the first PLA 60, the C1 pulse for the third PLA 62 coincides with the C2 pulse for the second PLA 61, etc. Thus, the internal operations for the dynamic PLA's 60–65 are offset but overlapped in time. The output of each dynamic PLA is valid during its C4 internal clock interval.

The C1-C4 internal clocking pulses for the dynamic PLA's 60–65 are obtained from the "PLA Clocks" output of the dynamic PLA clock logic unit 71 shown in FIG. 5B. The internal construction of this clock logic unit 71 is described in considerable detail in the above referenced copending application Ser. No. 350,683, filed in the name of Gerard A. Veneski et al.

The encode PLA 66 may also be a dynamic PLA but for simplicity of explanation herein, is assumed to be a static PLA.

In the FIG. 5 embodiment, the microword responsive control circuitry for controlling the operation of the data processor 10 includes two sets of control registers and decoders. These are shown in FIG. 5B. An "A" set is represented by master-slave control registers 72 and 73 and a decoder 74. A "B" set is represented by master-slave control registers 75 and 76 and a decoder 77. The loading of control registers 72 and 73 are respectively controlled by the A and B clock pulses from the clock generator 15a. In a converse manner, the loading of control registers 75 and 76 are respectively controlled by the B and A clock pulses. Thus, the first registers in each set are loaded during alternate time intervals.

In order to time multiplex or interleave the outputs of the A and B decoders 74 and 77, a set of A gates 78 are provided for the A decoder 74 and a set of B gates 79 are provided for the B decoder 77. The A gates 78 are enabled to pass signals by the A clock pulses, while the B gates 79 are enabled to pass signals by the B clock pulses. In this manner, the A decoder 74 and the B decoder 77 are caused to provide the control point signals in an alternating A-B-A-B manner. Many of the control point lines from the A decoder 74 are OR'ed with their counterparts from the B decoder 77 so that many of the units in the FIG. 1 data processor can receive their control point signals during either the A or the B clock phase.

The first cycle PLA 60 and the A and C decode PLA's 62 and 64 supply their microwords one at a time to the first A control register 72. Each microword, in turn, is passed to the second A control register 73 to drive the A decoder 74 to produce the output control point signals which are passed by the A gates 78 during the A clock phases. In a similar but time interleaved manner, the second cycle PLA 61, the B decode PLA 63 and the D decode PLA 65 supply their microwords one at a time to the first B control register 75, from whence they are transferred to the second B control register 76 to drive the B decoder 77 to produce the control point signals which are passed by the B gates 79 during the B clock phases.

Each microword is a multiple-bit binary word which is subdivided into several plural-bit control fields. One of these control fields is called a "PLA Output Strobe" field and causes the decoder to which it is supplied to activate a particular one of several control point signal lines which are used for producing so-called "PLA output strobes". The active PLA output strobe selects the PLA which is to supply the next microword to its associated control register. The PLA output strobes from the A decoder 74 select between the PLA's 60,62 and 64 to obtain the next microword for the A control register 72. The first cycle PLA 60 is selected to provide only the first microword needed for any given processor instruction. Thereafter, the microwords for the A control register 72 are alternately taken from the A and C decode PLA's 62 and 64. The PLA output strobes produced by the A decoder 74 are identified as S1, SA and SC and are individually supplied to the respective ones of PLA output gates 80,81 and 82. Each of these gate units 80-82 is comprised of a set of parallel gating circuits or gates which are simultaneously activated or enabled by its particular PLA output strobe. When enabled, a given set of gates supplies the microword appearing at the output of its associated PLA to the input of the A control register 72 via a common multiconductor PLA output bus 83.

In a corresponding manner, the PLA output strobes S2,SB and SD produced by the B decoder 77 are used to select between the PLA's 61,63 and 65 to obtain the next microword for the B control register 75. These PLA output strobes S2, SB and SD are individually supplied to the respective ones of the PLA output gates 84,85 and 86. The S2 strobe line for the second cycle PLA 61 is activated only to provide the microword for the second cycle for any given processor instruction. After that, he remaining microwords for the B control register 75 are obtained in an alternating manner from the B and D decode PLA's 63 and 65. These microwords are supplied to the B control register 75 via a common multiconductor PLA output bus 87.

The results of the foregoing multiplexing of the various microwords is to provide for each non-branch type processor instruction a sequence of microwords obtained from the various PLA's 60-65 in the following order: 1,2,A,B,C,D,A,B,C,D,A,B, . . . The numbers and letters identify the source PLA's. The first and second cycle PLA's 60 and 61 provide only the first and second microwords. The remainder of the microwords for any given non-branch type processor instruction are taken from the A,B,C and D decode PLA's in a sequential A,B,C,D manner, the exact number of additional microwords being whatever is needed to complete the execution of that particular processor instruction. As will be seen, the first and second cycle PLA's 60 and 61 are also used for the case of branch type processor instructions.

The encode PLA output register 67 is loaded and the sequence counter 69 and its associated register 70 are reset to zero by a control point signal pulse S$\phi$ obtained from the B decoder 77. This S$\phi$ pulse is produced by the microword which is the third from the end of the microword sequence for the processor instruction currently being executed. The sequence counter 69 is incremented once for each set of A,B,C and D microwords by the PLA output strobe pulse SB. The sequence counter buffer register 70 is reloaded once for each set of A,B,C and D microwords by the PLA output strobe pulse SC.

The dynamic PLA clock logic 71 is driven by the S$\phi$ control point signal, the various PLA output strobes S1,S2,SA,SB,SC and SD and the A and B clock pulses from the clock generator 15a. As described in the above-referenced application Ser. No. 350,683, these various pulses contain the necessary and sufficient information to produce the different sets of C1-C4 internal clocking pulses required by the different ones of the dynamic PLA's 60-65.

For purposes of executing branch type processor instructions, the FIG. 5A portion of the control unit further includes a condition testing PLA represented by a branch decision PLA 88 which is responsive to each branch type processor instruction for testing one or more of the ECONZ condition indicator signals supplied from the status register 36 via the bus 37. If the condition specified by the condition code field of the branch type instruction is met, an affirmative signal is produced on the single decision signal output line 89 of the branch decision PLA 88. If the specified condition is not met, the signal level on line 89 is such as to indicate a negative decision.

The branch type instruction mechanism further includes a branch code PLA mechanism responsive to an affirmative decision signal on the decision line 89 for providing the remainder of the microwords needed to execute the branch type instruction which produced the affirmative decision signal. This branch code PLA mechanism includes a branch code PLA 90, a sequence counter 91, and a buffer register 92. The buffer register 92 receives the decision signal line 89 from the branch decision PLA 88. It also receives via bus 93 a sufficient number of instruction register bits to identify the particular type of branch type instruction to be executed. In response to the contents of the buffer register 92 and the plural-bit number signals produced by the sequence counter 91, the branch code PLA 90 produces the remainder of the microwords needed to execute the branch-type instruction then resident in the instruction register 17. In this regard, the first two microwords for each branch type instruction are provided by the first and second cycle PLA's 60 and 61. The branch code PLA 90 produces the remainder of the microwords for each such instruction.

In the present embodiment, the branch code PLA 90 actually produces two microwords at a time. One, labelled as a "JA" microword, is for use during the A clock phase and the other, labelled as a "JB" microword, is for use during the next ensuing B clock phase. The appropriate time delay for the JB microword is obtained by loading it into a buffer register 94. Gates 95 and 96 control the supplying of the JA and JB microwords to the A and B control registers 72 and 75, respectively. The JA gates 95 are enabled and the JB buffer register 94 are loaded during the A clock phase by a PLA output strobe pulse SJA produced by the A decoder 74. The JB microword gates 96 are enabled during the B clock phase by a PLA output strobe pulse SJB produced by the B decoder 77.

In the present embodiment, each of the branch decision PLA 88 and the branch code PLA 90 is a relatively small static type PLA. As such, each is relatively fast acting and each has a very short access time. Thus, the branch code PLA 90 can produce microwords very rapidly as compared to the decode PLA's 62–65 which are of the dynamic type and which produce microwords for the non-branch type instructions.

With reference to FIG. 7, instruction N represents a branch type instruction. As is customary for all instructions, the last two microwords of the preceding instruction respectively produce the S1 and S2 strobe pulses for the first and second cycle PLA's 60 and 61. At some earlier point in time during the preceding instruction N−1, the next instruction, namely the branch instruction N, was loaded into the instruction register 17. As a consequence, by the time of occurrence of the S1 and S2 output strobes, the first and second cycle PLA's 60 and 61 have had an opportunity to digest this next instruction and to recognize the fact that it is a branch type instruction and to produce the appropriate first and second microwords for a branch type instruction. At the same time, the branch decision PLA 88 has had a chance to respond to the condition field of this branch type instruction, to test the appropriate one or ones of the ECONZ indicator bits from the status register 36 and to produce the appropriate decision signal on its output line 89.

The occurrence of the S1 strobe pulse during microword 17 of instruction N−1 does three things. It enables the first cycle PLA output gate 80 to cause the first microword for the branch type instruction to be supplied to the A control register 72. It also loads the buffer register 92 which drives the branch code PLA 90. It further resets the sequence counter 91 to a zero count condition. This starts the accessing of the branch code PLA 90 for this branch instruction N. As indicated by the BCP (Branch Code PLA) access line of FIG. 7, the accessing (ACC) of the branch code PLA 90 is accomplished during the last microword cycle, namely cycle 18 for instruction N−1. The speed of branch code PLA 90 is such that its access time is somewhat less than the duration of a single microword cycle. Thus, by the occurrence of the first microword cycle for instruction N, the branch code PLA 90 is producing a valid output. This is indicated by the BCP Output line of FIG. 7.

In the meanwhile, the microword from the first cycle PLA 60 has been loaded into the second A control register 73, this occurring during cycle 18 of instruction N−1. Thus, when the A gates 78 are enabled during cycle 1 of the branch instruction N, it is the 1P microword from the first cycle PLA 60 which is causing the A decoder 74 to produce the control point signals which appear at the output of A gates 78. One of these control point signals is the SJA strobe pulse which enables the branch code PLA output gate 95 so as to supply the first microword from the branch code PLA 90 to the A control register 72. This same SJA pulse loads the JB microword into the buffer register 94.

During this same cycle 1 for instruction N, the 2P microword from the second cycle PLA 61 is loaded into the second B control register 76. This 2P microword becomes active during the ensuing B clock phase when the B gates 79 are enabled. This occurs during cycle 2 of instruction N. This 2P microword produces an SJB strobe pulse which enables the JB buffer register output gates 96 to pass the first JB microword to the B control register 75. This SJB strobe pulse also increments the sequence counter 91 to cause the branch code PLA 90 to commence the accessing of the next pair of JA and JB microwords.

When the first JA microword becomes active during cycle 3 of instruction N, it produces another SJA strobe pulse for transferring the second JA microword to the control register 72. In a similar manner, when the first JB microword becomes active during cycle 4 of instruction N, it produces another SJB strobe pulse which transfers the second JB microword to the B control register 75. In this manner, the JA and JB microwords continue to select additional JA and JB microwords until cycle 11 of instruction N is reached. Since cycle 11 is the next to the last cycle for this particular example, the strobe field of the JA microword which becomes active at this time is instead coded to produce an S1 strobe pulse for selecting the first cycle PLA 60. In a similar manner, the JB microword which becomes active during cycle 12 of ,instruction N is coded to produce an S2 strobe pulse for the second cycle PLA 61. In this manner, the microword generating action for the next processor instruction N+1 is commenced.

The JB microword which is active during cycle 10 of instruction N, in addition to producing an SJB strobe pulse, also produces an Sφ restart pulse This φ restart pulse is used by the non-branch instruction mechanism, in particular, the encode PLA output register 67, the sequence counter 69 and the outer register 70 to prepare these items for the start of the next instruction N+1.

All of the circuitry for the control unit 14c shown in FIG. 5 is preferably formed on a single integrated circuit chip. The use of the branch decision PLA 88 and the branch code PLA 90 to produce most of the microwords needed for branch type instructions reduces the amount of chip space that would be otherwise required for the decode PLA's 62–65. This savings in chip space for the decode PLA 62–65 is greater than the additional chip space required for the branch decision PLA 88 and the branch code PLA 90. Thus, in addition to providing a faster branching action, this separate branch- decision/branch-code mechanism reduces the net chip space requirements and thereby facilitates the fabrication of the control unit on a single chip of reasonable dimensions.

Figure 8:
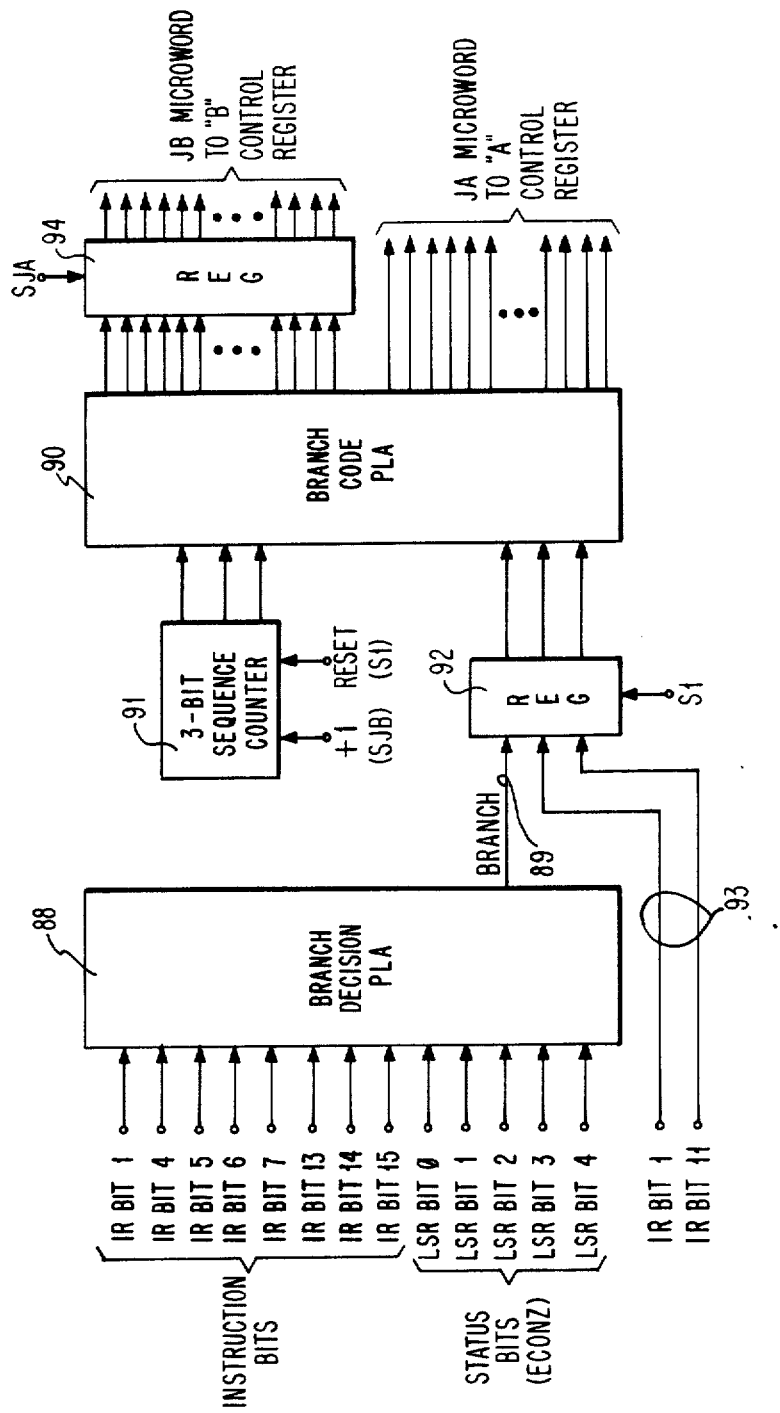
FIG. 8 shows in greater detail a representative form of construction for the branch decision and branch code portion of the FIG. 5 control unit.

Description of the FIG. 8 Branch Instruction Mechanism

Figure 9:
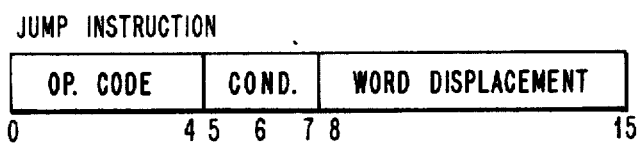
FIGS. 9 and 10 show the instruction formats for jump and branch type processor instructions which are used with the branch microword circuitry shown in FIG. 8.
Figure 10:
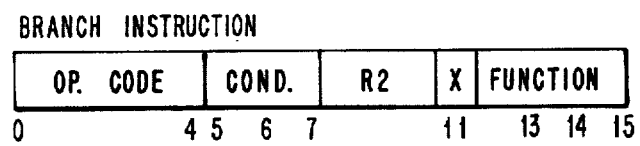

Referring now to FIG. 8, there is shown a specific implementation of the FIG. 5 branch instruction mechanism for a particular data processor architecture and instruction set currently in use. More particularly, FIG. 8 shows the implementation of the branch instruction mechanism for the IBM Series/1 family of data processors currently being manufactured and marketed by the International Business Machines Corporation of Armonk, N.Y. In connection therewith, FIGS. 9 and 10 show the instruction formats for the jump and branch instructions used in the IBM Series/1 architecture. Except for the first two microwords, the microword sequences needed to execute these jump and branch instructions are provided by the mechanism of FIG. 8.

The Series/1 jump instruction of FIG. 9 is a one word (16 bit) instruction which causes the data processor to jump to an out-of-sequence instruction if the condition specified by the condition (COND) field (bits 5–7) is met. The coding of this condition field is in accordance with the code values specified in FIG. 2. The address of the out-of-sequence program instruction which is jumped to is determined by adding the value in the word displacement field (bits 8–15) to the updated value in the instruction address counter 22. In other words, after fetching the jump instruction, it is necessary to increment the instruction address counter 22 before adding the word displacement value thereto. In the Series/1 architecture, the address value in the counter 22 is expressed in bytes (one byte equal 8 bits). Thus, it is necessary to increment the address counter 22 by a factor of two to get to the next 16-bit word starting address. Also, it is necessary to double the numerical value in the word displacement field of the instruction to convert it to a byte value before adding it to the updated address value in the address counter 22.

The Series/1 branch instruction of FIG. 10 is actually a two-word instruction but, for simplicity of illustration, the second word is not shown. This second word contains an address value. The condition field (bits 5–7) of the first word (the word shown in FIG. 10) indicates the condition to be tested. The different possible code values for this field are shown in FIG. 2. If the specified condition is met, the main storage address which is branched to is determined by placing a whole new address value into the instruction address counter 22. This new address is called the effective branch address. The manner of generation of this effective branch address will now be considered. As a first step, the address value contained in the second word (not shown) of the branch instruction is added to the contents of the general purpose register specified by the R2 field of the instruction to form a main storage address. This general purpose register is located in the local store unit 25 of FIG. 1. The address value in the second word of the instruction is expressed in bytes so that no word to byte conversion is needed. If the R2 field of the instruction equals zero, then no register contributes to the address generation, in which case the address value in the second word is, in fact, the desired main storage address.

As the next step in the generation of the effective branch address, bit 11 of the first instruction word is tested to determine whether the addressing is direct or indirect. If bit 11 is zero, the result from the first step is a direct address and is loaded into the instruction address counter 22. If bit 11 is one, the result of the first step is an indirect address. In this case, the contents of the main storage location specified by the indirect address are loaded into the instruction address counter 22.

Considering now the inputs shown in FIG. 8 for the branch decision PLA 88, the LSR bit φ through LSR bit 4 input lines respectively supply the E, C, 0, N and Z condition indicator bits from the status register 36. The IR (instruction register) bit inputs are obtained from the correspondingly numbered bit stages in the instruction register 17. These bit numbers correspond to the bit numbers shown in FIGS. 9 and 10. As is indicated in FIG. 8, IR bits 1, 4–7 and 13–15 are needed for enabling the branch decision PLA 88 to properly respond to the different types of jump and branch instruction. IR bits 5–7 represent the condition code field of the instruction. IR bit 1 enables the branch decision PLA 88 to distinguish between jump instructions and branch instructions. IR bit 1 has a value of zero for jump instructions and a value of one for branch instructions. IR bit 4 is used to distinguish between positive and negative type jump instructions. If bit 4 is zero, the instruction is a jump on condition instruction. If bit 4 is one, it is a jump on not condition instruction. Thus, for the case of jump instructions bit 4 corresponds to the condition type column in FIG. 2.

IR bits 13–15 are needed for the case of branch instructions. They represent bits in the function field and are needed to supplement the operation code (OP code) in order to completely identify the particular type of branch instruction to be executed.

The buffer register 92 receives, in addition to the branch decision bit on line 89, the instruction register bits 1 and 11. As mentioned, IR bit 1 distinguishes between jump and branch instructions. IR bit 11 is used for branch instructions and, as discussed in connection with FIG. 10, is used to distinguish between the direct and indirect addressing modes. The three bits in the buffer register 92 are supplied to the branch code PLA 90 and are used to select one of the four possible microword routines resident therein. If the branch decision signal on line 89 is zero, then the "no branch" microword routine or sequence is selected. For this case, no jump or branch is taken and the data processor merely fetches the next sequential program instruction.

If the decision signal on line 89 is affirmative and IR bit 1 is zero, then the microword sequence for jump instructions is selected in the branch code PLA 90. If decision line 89 and IR bit 1 are both one, and IR bit 11 is zero, then the microword sequence for doing branch instructions with direct addressing is selected. If all three inputs to register 92 have a value of one, then the microword sequence for executing branch instructions with indirect addressing is selected in the branch code PLA 90.

For any selected microword sequence, the binary number signals supplied by the sequence counter 91 enable the branch code PLA 90 to access the individual microwords in such microword sequence. As mentioned, two microwords at a time are generated by the branch code PLA 90. Thus, since the sequence counter 91 is a three counter, this means that up to 16 microwords can be provided for any given microword sequence. In addition, the first and second cycle PLA's 60 and 61 provide the first and second microwords for each of the different sequences. Thus, a total of 18 possible microwords are available for any given sequence if needed. The sequence shown in FIG. 7 for instruction N uses 12 microwords.

One secondary item of interest. The inputs of branch instruction mechanism of FIG. 8 are not gated and hence this mechanism reacts in one way or another to each and every processor instruction, both branch type and non- branch type, resident in the instruction register 17. For the case of non-branch type instructions, however, the branch code output gates 95 and 96 (FIG. 5A) are not activated and hence no erroneous microwords are supplied to the A and B control registers 72 and 75.

As previously indicated, the example given in FIG. 7 for instruction N is for the case of a jump on condition instruction where the condition is met. The primary actions which occur in the data processor 10 of FIG. 1 for this instruction N microword sequence are set forth in the following table.

| MICRO-WORD | PLA STROBE GENERATED | MAJOR ACTION PERFORMED |
| --- | --- | --- |
| 1 | SJA | Load Address Reg. 23 from Address Counter 22. Load A-Reg. bits 7–14 from IR bits 8–15. |
| 2 | SJB | Increment (+2) Address Counter 22. Set ALU to add. |
| 3 | SJA | Load B register 19 from Address Counter 22. |
| 4 | SJB | |
| 5 | SJA | ALU output to Address Counter 22 and Storage Address Register 29. |
| 6 | SJB | |
| 7 | SJA | Storage Data Reg. 30 to Instruction Reg. 17. |
| 8 | SJB | |
| 9 | SJA | |
| 10 | SJB | Generate S0 Restart signal. |
| 11 | S1 | |
| 12 | S2 | |

The loading of A register bits 7–14 from instruction register bits 8–15 that occurs for microword 1 places the word displacement field of the jump instruction into the A register 18 with a left shift of the word displacement field by one bit position. This serves to double the word displacement value to convert it to a byte displacement value.

In some respects, microwords 8–12 represent an idling interval wherein the data flow unit 11 of the processor is not doing any useful work. This idling interval is needed to give the dynamic PLA's 60–65 time to properly react to the new instruction which is loaded into the instruction register 17 during microword 7. The reason for this can be seen from FIG. 7 by referring to the dynamic PLA internal timing blocks for microwords 8–12 of instruction N. In other words, in this particular design, the next instruction must be loaded into the instruction register 17 no later than the sixth microword from the end of the microword sequence for the current instruction. For some types of processor instructions, there is useful work that can be done by the data flow unit 11 during this end of sequence interval, while for other instructions, like the one just described, there is no work taking place in the data flow unit 11.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a microprogram digital system wherein a sequence of microwords are used to control the execution of each system instruction, an improved microword generation mechanism comprising:

primary programmable logic array means responsive to the system instructions for producing the appropriate microword sequences for non-branch type system instructions;

condition indicator circuitry for supplying indicator signals indicating whether the results of arithmetic and logic operations in the system meet certain types of conditions;

a condition testing programmable logic array responsive to the condition field of a conditional branch type system instruction for testing the appropriate indicator signal or signals and producing an affirmative decision signal if the specified condition is met;

and a branch code programmable logic array responsive to the affirmative decision signal for producing a branch type microword sequence.

2. In a microprogrammed digital system wherein a sequence of microwords are used to control the execution of each system instruction, an improved microword generation mechanism comprising:

primary programmable logic array means responsive to the system instructions for producing the appropriate microword sequences for non-branch type system instructions;

condition indicator circuitry for supplying indicator signals indicating whether the results of arithmetic and logic operations in the system meet certain types of conditions;

a condition testing programmable logic array responsive to the condition field of a conditional branch type system instruction for testing the appropriate indicator signal or signals and producing an affirmative decision signal if the specified condition is met;

a sequence counter for supplying a sequence of number signals;

and a branch code programmable logic array responsive to the affirmative decision signal and to the sequence of number signals for producing a sequence of microwords needed to execute the branch type system instruction which produced the affirmative decision signal.

3. An improved microword generation mechanism in accordance with claim 2 wherein the branch code programmable logic array is also responsive to at least one of the bits in the conditional branch type system instruction for enabling it to select different microword sequences for different types of jump and branch instructions.

4. An improved microword generation mechanism in accordance with claim 2 wherein the primary programmable logic array means includes at least one programmable logic array responsive to system instructions and a sequence counter for supplying a sequence of number signals to this programmable logic array for causing it to produce a sequence of microwords for each system instruction to which it is responsive.

5. In a microprogrammed digital system wherein a sequence of microwords are used to control the execution of each system instruction, an improved microword generation mechanism comprising:

an initial programmable logic array mechanism responsive to each system instruction of every type to be executed for providing the initial microword or microwords needed in the execution of such instruction;

a plurality of additional programmable logic array mechanisms responsive to each non-branch type system instruction for providing additional microwords needed to execute such instruction;

condition indicator circuitry for supplying indicator signals indicating various conditions concerning the results of arithmetic and logic operations in the system;

a condition testing programmable logic array responsive to each branch type system instruction for testing the appropriate indicator signal or signals and producing an affirmative decision signal if the condition specified by the condition field of such instruction is met;

and a branch code programmable logic array mechanism responsive to the affirmative decision signal for providing additional microwords needed to execute the branch type instruction which produced the affirmative decision signal.

6. An improved microword generation mechanism in accordance with claim 5 and further including:

microword-responsive control circuitry for controlling the operation of the digital system;

and multiplexing circuitry for supplying microwords from different ones of the programmable logic array mechanisms to the microword-responsive control circuitry during different time intervals.

* * * * *